United States Patent

Musso, Jr. et al.

[11] Patent Number: 5,397,172
[45] Date of Patent: Mar. 14, 1995

[54] TRUCK BODY WITH INTEGRATED CONVEYOR SYSTEM

[75] Inventors: Charles S. Musso, Jr., Hammondsport; Tom W. Musso, Bath, both of N.Y.

[73] Assignee: Air-Flo Mfg. Co., Inc., Prattsburg, N.Y.

[21] Appl. No.: 111,995

[22] Filed: Aug. 25, 1993

[51] Int. Cl.6 ............................................. B60P 1/36
[52] U.S. Cl. .................................. 298/22 R; 239/676; 298/7; 414/519
[58] Field of Search ................. 239/657, 672, 676; 296/51, 61; 298/7, 22 R; 414/519

[56] References Cited

U.S. PATENT DOCUMENTS

| | | |
|---|---|---|
| 2,517,151 | 8/1950 | Weston . |
| 2,609,952 | 9/1952 | Balzer et al. . |
| 2,967,056 | 1/1961 | D'Amato ........................... 298/7 |
| 4,568,237 | 2/1986 | Krause et al. ..................... 414/519 |
| 4,886,214 | 12/1989 | Musso, Jr. et al. ............... 239/676 |

FOREIGN PATENT DOCUMENTS 967340  10/1982  U.S.S.R. ............................ 239/676

Primary Examiner—Michael S. Huppert
Assistant Examiner—Janice L. Krizek
Attorney, Agent, or Firm—Chilton, Alix & Van Kirk

[57] ABSTRACT

A dump truck having an endless-conveyor structurally integrated into the bottom of the dump body, a conveyor hood opening in the tailgate of the dump body in longitudinal alignment with the conveyor and a conveyor hood mounted within the conveyor hood opening for being shifted between a forward extended position thereof covering the rear end of the conveyor and a rearward retracted position thereof generally flush with the inner face of the tailgate to facilitate use of the truck for open truck hauling with the tailgate in a flat open position extending rearwardly from the bottom of the dump body.

21 Claims, 5 Drawing Sheets

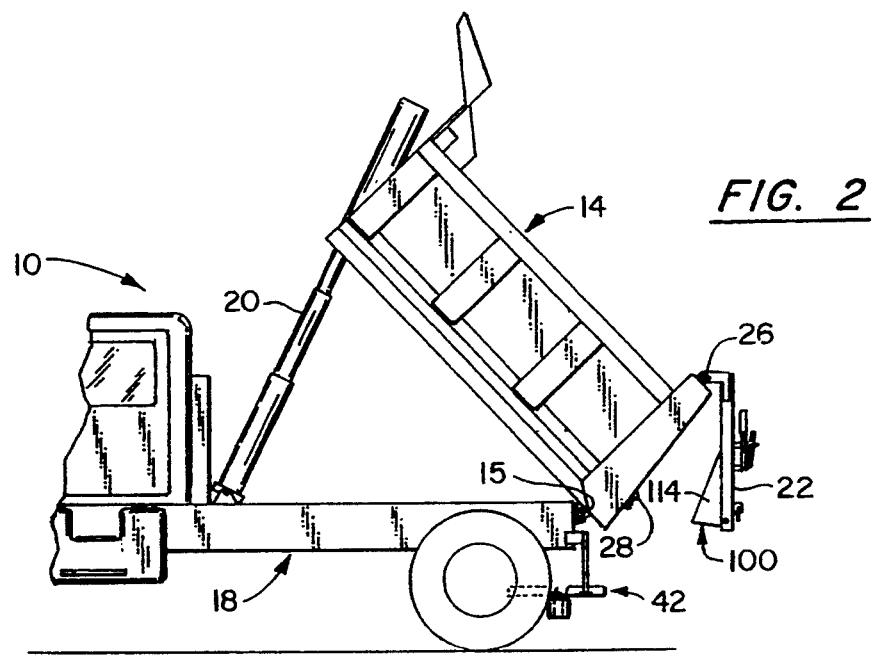
FIG. 2
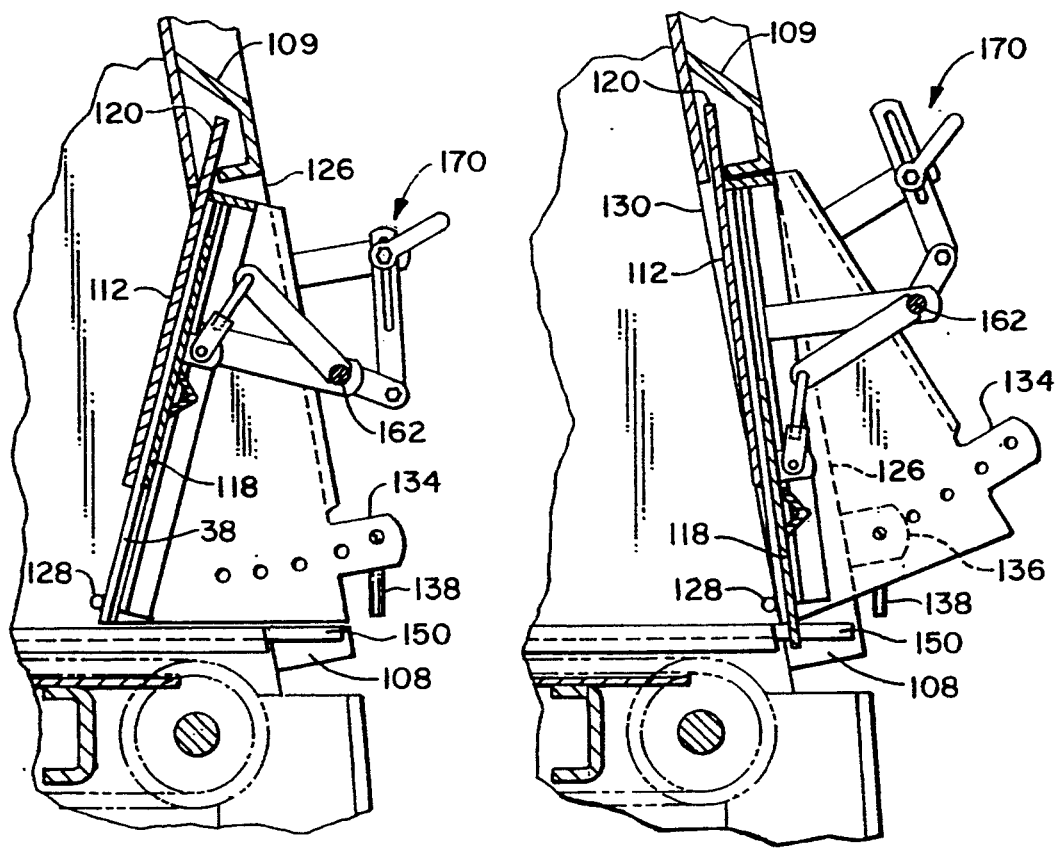
FIG. 4
FIG. 5

TRUCK BODY WITH INTEGRATED CONVEYOR SYSTEM

SUMMARY OF THE INVENTION

The present invention relates generally to truck bodies of the type having a longitudinally extending endless conveyor integrated into the bottom of the truck body and a conveyor hood for the rear end of the endless conveyor integrated into the tailgate. The integrated conveyor system permits use of the truck body in a conveyor mode of operation in which the tailgate is closed and the material contents of the truck body are conveyed rearwardly through a conveyor opening established by the conveyor hood. The integrated conveyor system also permits use of the truck body in a hauling mode of operation in which the tailgate is in a flat open position extending rearwardly from the bottom of the truck body.

A principal aim of the present invention is to provide in a truck body of the type described, a new and improved integrated conveyor system which facilitates use of the truck body in both conveyor and hauling modes of operation. In accordance with the present invention, the conveyor hood for the rear end of the conveyor is configured and mounted to facilitate use of the truck body in each of those modes of operation.

Another aim of the present invention is to provide in a truck body of the type described, a new and improved conveyor hood for the rear end of the conveyor for regulating the rate at which the material contents of the truck body are dispensed by the endless conveyor.

A further aim of the present invention is to provide in a dump truck having a truck body of the type described, a new and improved integrated conveyor system which facilitates use of the dump truck in a dump mode of operation in which the tailgate is in a flat open position and the front end of the truck body is raised to dump the material contents of the truck body rearwardly from the truck body.

Other objects will be in part obvious and in part pointed out more in detail hereinafter.

A better understanding of the invention will be obtained from the following detailed description and the accompanying drawings of an illustrative application of the invention.

BRIEF DESCRIPTION OF THE DRAWINGS

In The Drawings:

FIG. 2 is a reduced, side elevation view, partly broken away, of the dump truck showing the dump body in its fully raised position and the tailgate in an open hanging position;

FIGS. 4 and 5 are enlarged, partial, longitudinal section views, partly broken away and partly in section, showing the conveyor hood in fully forward and fully retracted positions respectively, and showing the conveyor door in completely open and completely closed positions respectively;

DESCRIPTION OF THE PREFERRED EMBODIMENTS

Figure 1:
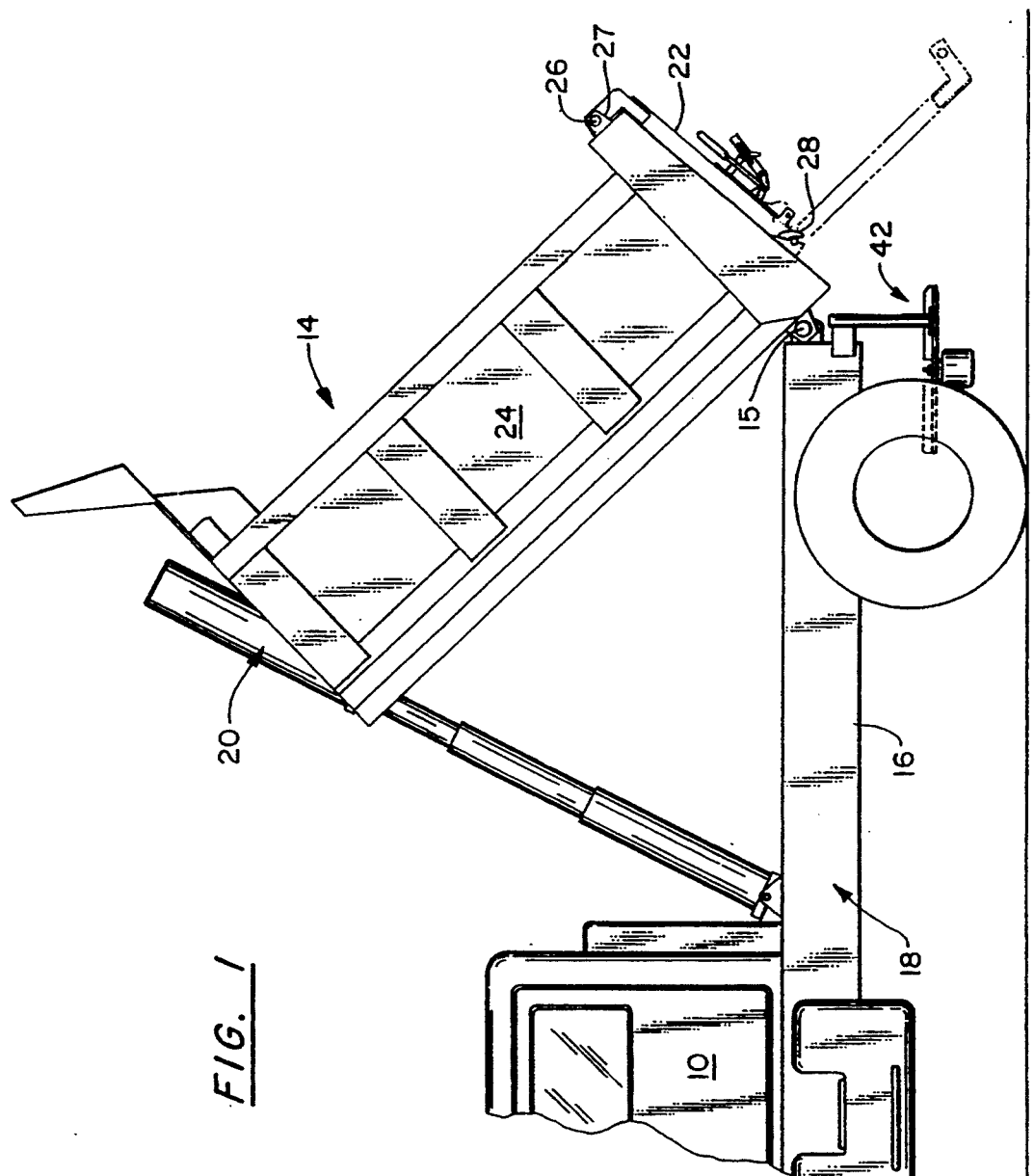
FIG. 1 is a side elevation view, partly broken away, of a dump truck incorporating an integrated conveyor system according to the present invention and showing the dump body of the truck in its fully raised position and the tailgate of the dump body in full lines in a closed position and in broken lines in a flat open position.

In the drawings, like numerals are used to designate the same or like parts. A dump truck 10 incorporating a preferred embodiment of the present invention has a dump body 14 mounted on a truck frame 18 for pivotal movement about a rear pivot axis 15 between a normal or horizontal position resting on a pair of parallel longitudinal beams or rails 16 of the truck frame 18 and a raised dump position shown in FIG. 1. A telescopic lift cylinder 20 is connected between the truck frame 18 and forward end of the dump body 14 to hydraulically raise and lower the dump body 14 in a conventional manner.

The dump body 14 has a rear tailgate 22 which, in its closed position, engages the rear ends of the sides 24 of the dump body 14. In a conventional manner, the tailgate 22 can be pivotally mounted at either the top or bottom of the tailgate 22. In FIG. 2, the tailgate 22 is shown mounted for pivotal movement about an upper transverse horizontal axis. For that purpose, a pair of pivot pins 26 are inserted into cooperating bearings 27 mounted on the tailgate 22 and sides 24 of the dump body 14. Conventional latches 28 are provided at the bottom of the tailgate 22. The latches 28 are used to latch the tailgate 22 in its closed position and also to selectively mount the tailgate 22 for pivotal movement about a lower transverse horizontal axis. The latches 28 comprise transverse stub shafts welded to the tailgate 22 and hand operated couplings mounted on the sides 24 of the dump body 14. The tailgate latches 28 are unlatched to dump the material contents of the dump body 14 through the tailgate opening when the dump body 14 is raised as shown in FIG. 1. The tailgate 22 can be pivoted downwardly about the lower transverse axis to an open flat position extending rearwardly from the bottom of the dump body 14 as shown in full lines in FIG. 7 and in broken lines in FIG. 1. For that purpose, after closing the latches 28, the upper pivot pins 26 are removed and the tailgate 22 is manually lowered to its lower, flat open position. That procedure is reversed for remounting the tailgate 22 for pivotal movement about the upper transverse axis.

With the tailgate 22 in its flat open position, the rear end of the dump body 14 is open and the inner flat face 130 of the tailgate 22 provides a rearward extension of the generally flat floor sections 68 of the dump body 14. The truck can then be used for open truck hauling and open truck dumping, for example for hauling and dumping long articles such as pipe, tree limbs, etc. which extend rearwardly beyond the bottom of the truck body and which overlie all or part of the flat tailgate extension.

A conveyor system 30 is integrated into the bottom structure 34 and tailgate 22 of the dump body 14 to provide a multiple purpose truck which may be used in the two described dump modes of operation and also in a conveyor mode of operation by simple manual conversion of the truck 10 to each mode of operation. Except as hereafter described, the integrated conveyor system 30 is like that disclosed in U.S. Pat. No. 4,886,214, granted Dec. 12, 1989, and entitled "Dump Truck With Integrated Spreader System". U.S. Pat. No. 4,886,214 is therefore incorporated herein by reference. The conveyor system 30 comprises a central longitudinally extending endless conveyor 32 integrated into the bottom structure 34 of the dump body 14 and a conveyor hood assembly 100 integrated into the tailgate 22. A suitable discharge chute 40 is mounted on the truck frame 18 below the rear end of the endless conveyor 32 for directing material discharged off the rear end of the conveyor downwardly onto a spinner type spreader 42 which spreads the material onto the roadway.

The endless conveyor 32 comprises front and rear sprocket shafts 60 (which may be substantially identical), each having a pair of laterally spaced sprockets 62 for supporting a pair of laterally spaced conveyor drive chains 64. A suitable hydraulic drive mechanism (not shown) is connected to the rear sprocket shaft 60 for driving the conveyor chains 64. The flights 66 of the conveyor 32 are suitably connected to the links of the conveyor chains 64. The upper plane of conveyor flights 66 is recessed slightly (e.g., two inches) below the outer flat coplanar bottom sections 68 of the dump body 14 on the opposite sides of the endless conveyor 32.

The hood assembly 100 is mounted within a lower, central, rectangular opening 104 in the tailgate 22 to be selectively manually positioned to facilitate use of the truck body 14 in each of its modes of operation. The tailgate has two vertical gussets 108 forming the sides of the hood opening 104 and a transverse gusset 109 forming the top of the hood opening 104. The hood opening 104 is open at the bottom of the tailgate 22.

The hood assembly 100 has a triangularly shaped conveyor hood 102. The hood 102 comprises a front generally flat face 106 and a pair of opposed parallel side plates 114, 115. The side plates 114, 115 slide freely between the gussets 108 forming the sides of the hood opening 104. The front face 106 of the hood 102 comprises an upper face plate 112, a pair of guide bars 116 at the front lateral edges of the hood 102 and a lower sliding door or gate 118. The sliding door 118 is selectively adjusted as hereafter described to establish an opening 38 above the endless conveyor 32. The upper face plate 112 has an upper extension or flange 120 received within a transverse slot 122 in the gusset 109 forming the top of the tailgate opening 104. The transverse slot 122 provides a pivot axis for pivotal movement of the hood 102 within the hood opening 104 and a loose connection for raising and lowering the hood 102 slightly within the hood opening 104. The generally triangular side plates 114, 115 have laterally outwardly projecting flanges 124 along their rear edges. These flanges 124 serve as stops engageable with the rear or outer face 126 of the tailgate 22 to establish a fully forward or fully extended position of the hood 102. Transverse stop pins 128 are mounted on the guide bars 116 to engage the front or inner face 130 of the tailgate 22 to establish a fully retracted position of the hood 102. The hood 102 can be manually positioned in its fully forward and fully retracted positions and in any intermediate position as desired. When repositioning the hood 102, the hood 102 is preferably manually lifted slightly to facilitate such repositioning.

In the partly and fully extended positions of the hood 102, the front face 106 of the hood 102 extends downwardly and forwardly at an angle from the front face 130 of the tailgate 22. The rear sprocket shaft 60 is mounted below or rearwardly of the front face 106 of the conveyor hood 102 with the conveyor hood 102 in its fully forward or extended position shown in FIG. 3. The conveyor hood 102 is thereby positioned to cover the rear end of the conveyor 32. In the conveyor mode of operation, the conveyor door 118 can be vertically adjusted to regulate the rate at which the material contents of the truck body 14 are conveyed by the endless conveyor 32 through the door opening 38 and discharged off the rear end of the conveyor 32. In a fully retracted position of the conveyor hood 102, the front face 106 of the hood 102 is approximately flush with (but is recessed slightly rearwardly of) the inner flat face 130 of the tailgate 22. Also, in that position of the hood 102, the upper face plate 112 and door 118 are inclined slightly to the front face 130 of the tailgate 22. The door 118 is preferably maintained in its lower closed position while the hood 102 is in that fully retracted position.

Figure 3:
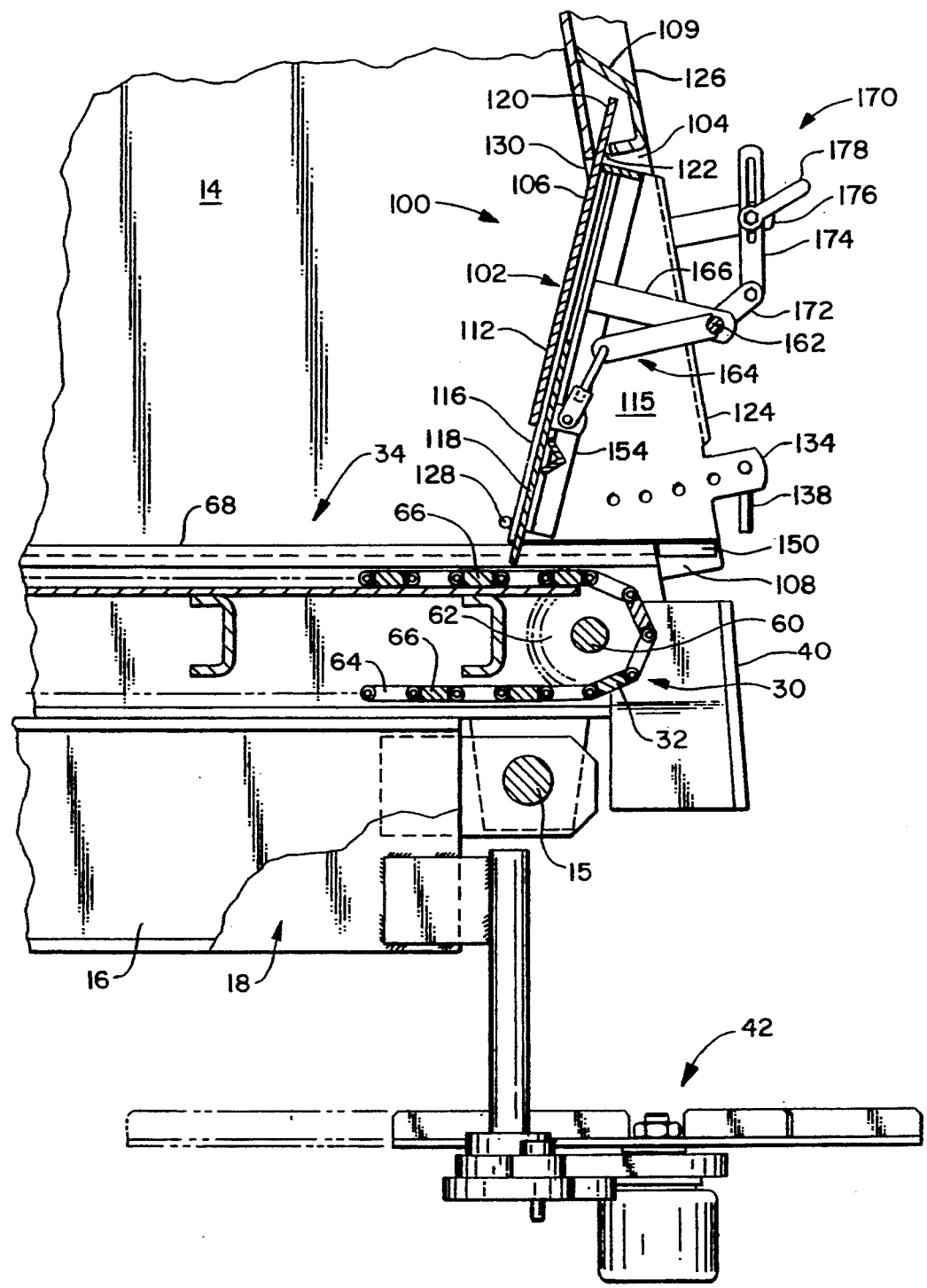
FIG. 3 is an enlarged, partial, longitudinal section view, partly broken away and partly in section, of the rear end of the dump truck, with the dump body in its lower normal position resting on the truck frame, and showing a conveyor hood of the dump body in a fully forward or extended position and a conveyor door of the hood in a completely closed position.
Figure 6:
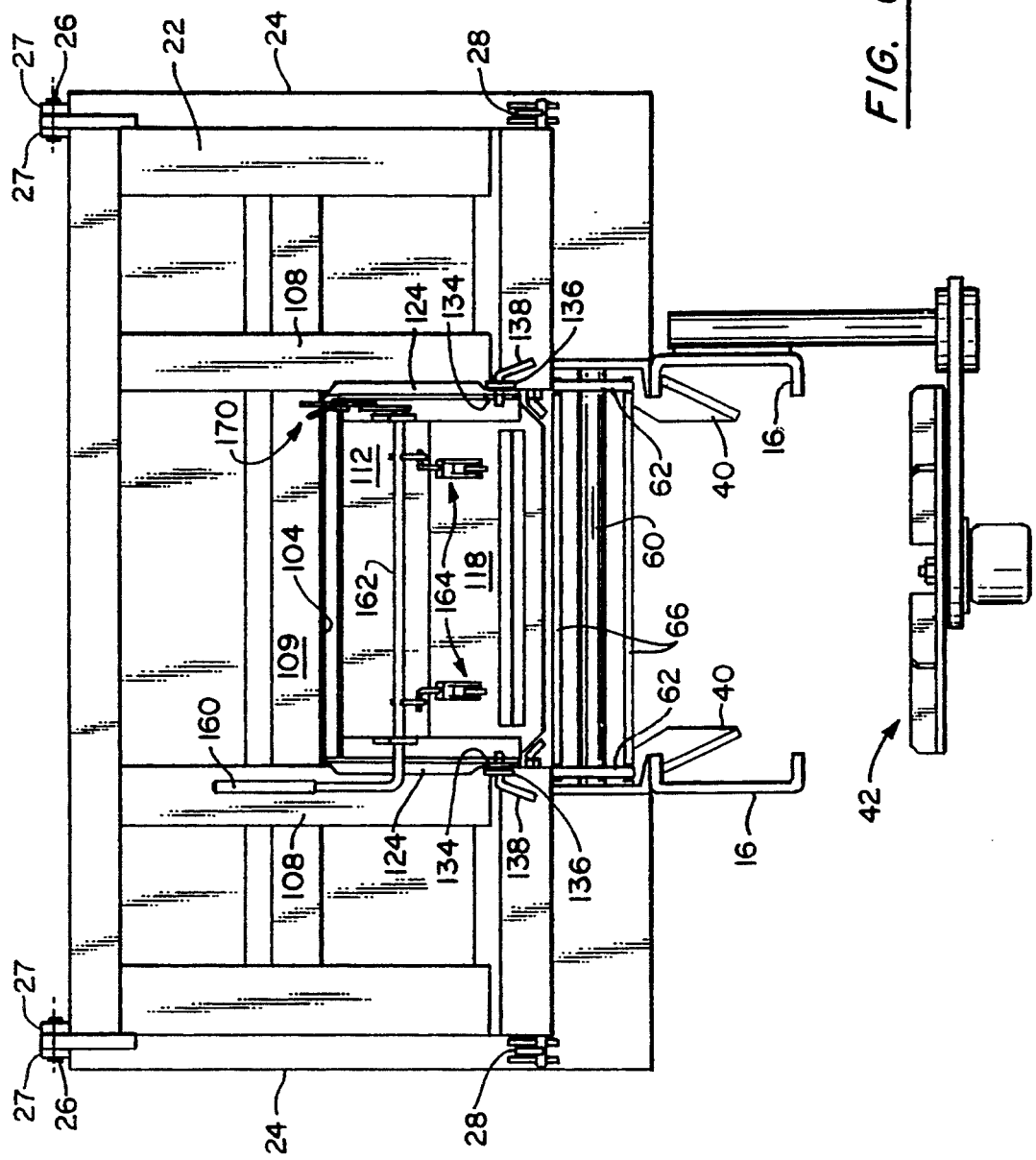
FIG. 6 is an enlarged, partial, transverse section view, partly broken away, of the dump truck with the dump body in its lower normal position.
Figure 7:
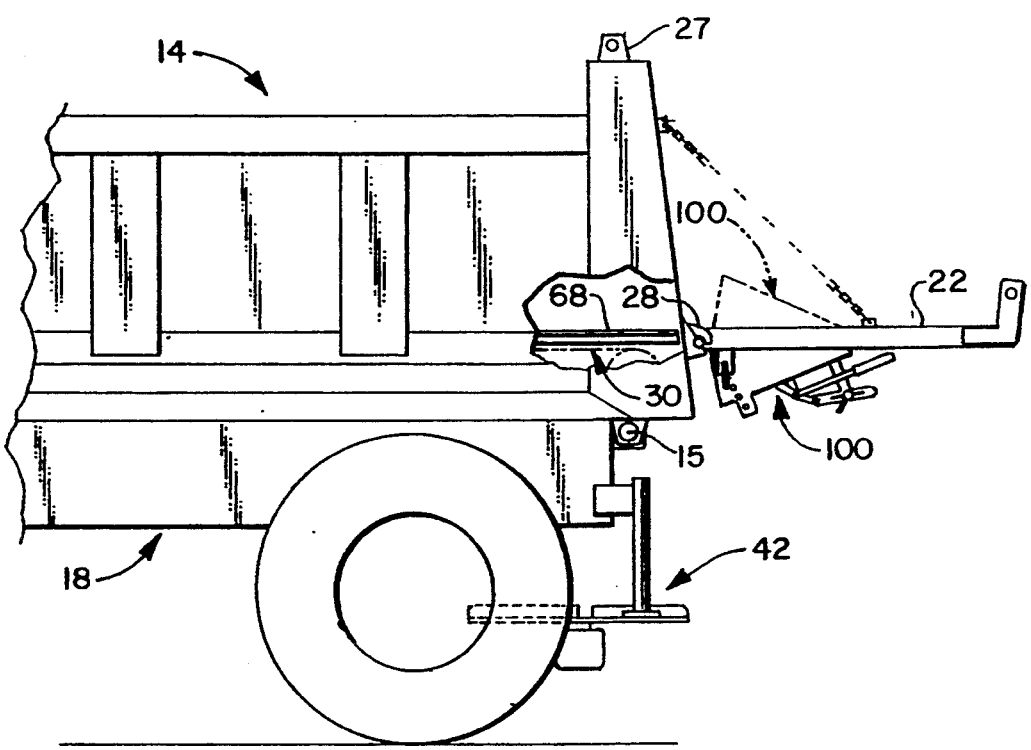
FIG. 7 is an enlarged, partial, side elevation view, partly broken away, of the dump truck showing the dump body in its lower normal position and the tailgate in a flat open position and showing the conveyor hood in solid lines in its fully retracted position and in broken lines in its fully extended position.

A rearwardly projecting lug 134 is provided at the rear end of each side plate 114, 115 and a cooperating lug 136 is mounted on the rear face 126 of the tailgate 22. Two pairs of lugs 134, 136 are thereby formed having aligned openings for receiving two generally L-shaped locking pins 138 for locking the hood 102 in its fully forward position. As shown in FIGS. 3–5, additional openings may be provided in the side plates 114, 115 for locking the hood 102 in its fully retracted position and in one or more intermediate positions. To shift the hood 102, the locking pins 138, if installed, are first removed and then the hood 102 is raised and moved to the desired position. The locking pins 138 are then installed to lock the hood 102 in the desired position. The hood 102 is placed in its fully retracted position when using the truck body in a hauling mode of operation. In that mode of operation, with the tailgate 22 in its flat open position as shown in FIG. 7, the hood 102 is held by gravity in its fully retracted position.

With the tailgate 22 pivotally mounted at the top of the tailgate 22 and with the hood in either its fully forward or fully retracted position, the hood 102 is vertically supported within the hood opening 104 by a pair of transverse lugs 150 provided at the bottom of the hood opening 104. The lugs are welded to the gussets 108 forming the sides of the opening 104. In the fully forward position of the hood 102, the lower coplanar edges of the side plates 114, 115 rest on the supporting lugs 150 with those edges parallel to and slightly above the flat outer bottom sections 68 of the dump body 14. The hood 102 is thereby positioned to prevent material flow under the side plates 114, 115 and also to prevent the side plates 114, 115 from engaging and scraping against the bottom sections 68 of the dump body as the tailgate 22 is swung about the upper pivot axis when using the truck 10 in its dump mode of operation.

In the conveyor mode of operation, the sliding door 118 of the hood 102 is preferably used to establish a conveyor opening for regulating the rate at which the material contents of the dump body are dispensed by the endless conveyor 32. In an alternative, with the door 118 closed, the hood 102 is partly retracted into the hood opening 104 to establish a suitable opening at the rear end of the conveyor 32 for regulating the dispensing rate. (Since the door 118 is not used in that alternative, if desired, the hood 102 could be constructed without an adjustable door 118 and with the front face plate 112 extending to the bottom of the side plates 114, 115.) In another alternative, the sliding door 118 is used in conjunction with a partial retraction of the hood 102 to regulate the dispensing rate.

The flat guide bars 116 are welded to the inside of the hood 102 at the corners of the face plate 112 and side plates 114, 115. The bars 116 extend the full height of the front face 106 of the hood and serve as front edge guides for the sliding door 118. Angle iron brackets 154 are welded to the inside of the side plates 114, 115 parallel to and spaced slightly from the front guide bars 116 to form slots for guiding the conveyor door 118 as it is shifted between its open and closed positions. The transverse stop pins 128 are welded to the front face of the guide bars 116, preferably at or near the bottom of the guide bars 116.

The door 118 is shifted by means of an L-shaped handle 160 having a transverse shaft 162 connected by two toggle links 164 to the door 118. The shaft 162 is rotatably mounted on a pair of upstanding lugs 166 welded to the brackets 154. Each toggle link 164 comprises an arm fixed to the transverse shaft 162 and an adjustable link pivotally connected to both the shaft mounted arm and the door 118. With the hood 102 locked in position by the locking pins 138, pulling the handle down raises the door 118 and pushing the handle up lowers the door.

A lock 170 is provided for locking the door 118 in its selected position. The door lock 170 comprises an arm 172 fixed to the end of the shaft 162 and a link 174 pivotally mounted on the outer end of the arm 172. The link 174 has a slot receiving a threaded fastener secured to a mounting lug 176 fixed to the adjacent side plate. A nut mounted on the fastener has a handle 178 for rotating the nut to selectively lock the shaft 162 against rotation. With the shaft 162 locked, the shaft 162 can be used to manually lift and shift the conveyor hood 102 within the hood opening 104 to position the hood 102.

As will be apparent to persons skilled in the art, various modifications, adaptations and variations of the foregoing specific disclosure can be made without departing from the teachings of the present invention.

We claim:

1. In a truck having a truck body forming a receptacle with a rear tailgate opening; the truck body having a bottom structure, providing the floor of the receptacle, with a longitudinally extending endless conveyor structurally integrated therein for conveying the material contents of the receptacle rearwardly for being discharged off the rear end of the conveyor; the truck body having a conveyor hood for covering the rear end of the conveyor and operable for controlling said discharge off the rear end of the conveyor, a tailgate, and means for mounting the tailgate for movement between a closed, position thereof closing the tailgate opening and a flat open position thereof providing a rearward extension of the floor of the truck body receptacle for open truck hauling; the improvement wherein the tailgate has a conveyor hood opening therein in longitudinal alignment with the conveyor and wherein the truck body comprises means for mounting the conveyor hood for being longitudinally shifted within the hood opening between a forward extended position thereof covering the rear end of the conveyor and a rearward retracted position thereof which facilitates said open truck hauling.

2. A truck according to claim 1 wherein the conveyor hood mounting means provides for longitudinally shifting the conveyor hood within the hood opening to at least one intermediate position between its said extended and retracted positions for controlling said discharge off the rear end of the conveyor.

3. A truck according to claim 1 further comprising means for retaining the conveyor hood in its said extended position.

4. A truck according to claim 2 further comprising means for retaining the conveyor hood in its said extended and intermediate positions.

5. A truck according to claim 1 wherein the conveyor hood mounting means provides for mounting the conveyor hood on the tailgate and within the hood opening for generally pivotal movement between its said extended and retracted positions about a transverse axis at the upper end of the conveyor hood, and wherein the conveyor hood has a front face extending downwardly from said transverse axis and forwardly from said transverse axis in said extended position of the conveyor hood.

6. A truck according to claim 5 wherein the tailgate has an inner face on opposite sides of the hood opening and wherein the front face of the conveyor hood, in said retracted position of the conveyor hood, is approximately flush with said inner face of the tailgate.

7. A truck according to claim 1 wherein the conveyor hood has a conveyor door adjustable between an open position thereof providing a conveyor opening for and aligned with the conveyor and a closed position thereof closing the conveyor opening, and door operating means mounted on the conveyor hood for opening and closing the conveyor door from the rear of the tailgate.

8. A truck according to claim 1 wherein the conveyor hood mounting means provides for mounting the conveyor hood on the tailgate and within the hood opening for generally pivotal movement between its said extended and retracted positions about a transverse axis.

9. A truck according to claim 1 wherein the conveyor hood mounting means provides for mounting the conveyor hood for generally pivotal movement between its said extended and retracted positions about a transverse axis.

10. A truck according to claim 1 wherein the conveyor hood mounting means comprises a transverse slot in the tailgate at the top of the hood opening and an upstanding flange on the conveyor hood loosely received within the transverse slot to permit the conveyor hood to be longitudinally shifted within the hood opening and to be raised and lowered slightly within the hood opening to facilitate shifting the conveyor hood between its said extended and retracted positions.

11. A truck according to claim 9 wherein the conveyor hood comprises a front face and a pair of parallel side plates on opposite sides of the front face and extending rearwardly therefrom into the hood opening.

12. In a dump truck having a longitudinally extending truck frame, a dump body pivotally mounted at the rear end thereof on the truck frame, a lift cylinder connected between the truck frame and forward end of the dump body for raising and lowering the dump body between a lower normal position thereof resting on the truck frame and an upper raised position thereof, the dump body forming a receptacle with a rear tailgate opening and having a tailgate movable between a closed position closing the tailgate opening and a flat open position providing a rearward extension of the dump body receptacle for open truck hauling and latching means for latching the tailgate in its closed position, the dump body having a bottom structure, providing the floor of the dump body receptacle, with a longitudinally extending endless conveyor structurally integrated therein for conveying the material contents of the dump body receptacle rearwardly for being discharged off the rear end of the conveyor, the dump body having a conveyor hood, in longitudinal alignment with the conveyor, with a conveyor door adjustable, for controlling the rate of said discharge off the rear end of the conveyor, between an open position thereof providing a conveyor opening for and aligned with the conveyor and a closed position thereof closing the conveyor opening, and door operating means for opening and closing the conveyor door from the rear of the tailgate; the improvement wherein the tailgate has a conveyor hood opening therein in longitudinal alignment with the conveyor and wherein the dump body comprises means for mounting the conveyor hood for being longitudinally shifted within the hood opening between a forward extended position thereof covering the rear end of the conveyor and a rearward retracted position thereof retracted, at least in part, into the hood opening.

13. A dump truck according to claim 12 wherein the conveyor hood mounting means provides for mounting the conveyor hood on the tailgate and within the hood opening for generally pivotal movement between its said extended and retracted positions about a transverse axis at the upper end of the conveyor hood.

14. A dump truck according to claim 13 wherein the conveyor hood has a front face extending downwardly from said transverse axis and forwardly from said transverse axis in said extended position of the conveyor hood and a pair of parallel side plates extending rearwardly from the front face of the conveyor hood into the hood opening.

15. A dump truck according to claim 12 wherein the conveyor hood mounting means provides for mounting the conveyor hood within the hood opening for generally pivotal movement between its said extended and retracted positions.

16. In a dump truck having a longitudinally extending truck frame, a dump body pivotally mounted at the rear end thereof on the truck frame and forming a receptacle with a rear tailgate opening, a lift cylinder connected between the truck frame and the forward end of the dump body for raising and lowering the dump body between a lower normal position thereof resting on the truck frame and an upper raised position thereof, the dump body having a bottom structure, providing the floor of the dump body receptacle, with a longitudinally extending endless conveyor structurally integrated therein for conveying the material contents of the dump body receptacle rearwardly for being discharged off the rear end of the conveyor, the dump body having a conveyor hood for covering the rear end of the conveyor and operable for controlling said discharge off the rear end of the conveyor, a tailgate pivotal between a closed position thereof closing the tailgate opening and an open position thereof and latching means for latching the tailgate in its closed position; the improvement wherein the tailgate has a conveyor hood opening therein in longitudinal alignment with the conveyor, and wherein the dump body comprises means for mounting the conveyor hood for being longitudinally shifted within the hood opening between a forward extended position thereof covering the rear end of the conveyor when the tailgate is in its closed position, and at least one rearward position thereof, rearwardly of said forward extended position, for controlling said discharge off the rear end of the conveyor when the tailgate is in its closed position.

17. A dump truck according to claim 16 wherein the conveyor hood mounting means provides for longitudinally shifting the conveyor hood within the hood opening to a plurality of said rearward positions thereof rearwardly of said forward extended position.

18. A dump truck according to claim 16 wherein the dump body comprises retaining means for retaining the conveyor hood in each of its said positions.

19. A dump truck according to claim 16 wherein the conveyor hood mounting means provides for mounting the conveyor hood on the tailgate and within the hood opening for generally pivotal movement between its said extended and rearward positions about a transverse axis.

20. A dump truck according to claim 19 wherein said transverse axis is at the upper end of the conveyor hood and wherein the conveyor hood has a front face extending downwardly from said transverse axis and forwardly from said transverse axis in said extended position of the conveyor hood, and a pair of parallel side plates extending rearwardly from the front face of the conveyor hood into the hood opening.

21. A dump truck according to claim 16 wherein the conveyor hood mounting means provides for mounting the conveyor hood within the hood opening for generally pivotal movement between its said extended and adjusted positions about a transverse axis.

* * * * *